United States Patent [19]

Dorsch et al.

[11] Patent Number: 4,665,361
[45] Date of Patent: May 12, 1987

[54] METHOD AND APPARATUS FOR THE CONTACTLESS DETERMINATION OF THE RELATIVE POSITIONS OF TWO BODIES

[75] Inventors: Manfred Dorsch, Adelsheim; Josef Heinfling, Untergruppenbach, both of Fed. Rep. of Germany

[73] Assignee: H. F. Stollberg Maschinenfabrik, GmbH, Beerfelden, Fed. Rep. of Germany

[21] Appl. No.: 596,441

[22] Filed: Apr. 3, 1984

[30] Foreign Application Priority Data

Apr. 7, 1983 [CH] Switzerland ............... 1879/83

[51] Int. Cl.$^4$ ............................... G01B 7/14
[52] U.S. Cl. ............................. 324/207; 81/9.51; 324/226; 324/243; 324/263
[58] Field of Search ............... 324/207, 208, 239, 240, 324/241, 242, 243, 260, 261, 262, 263, 226; 340/870.35; 104/284; 81/9.51; 180/168, 167

[56] References Cited

U.S. PATENT DOCUMENTS

| 2,124,579 | 7/1938 | Knerr et al. ............... 324/226 |
| 3,470,460 | 9/1969 | Panofsky et al. ............... 324/226 X |
| 4,015,497 | 4/1977 | Burgess ............... 81/9.51 X |
| 4,310,789 | 7/1982 | Mank et al. ............... 180/168 |
| 4,422,041 | 12/1983 | Lienau ............... 324/208 X |
| 4,538,107 | 8/1985 | Varone ............... 324/242 X |

FOREIGN PATENT DOCUMENTS 0071013  6/1977  Japan ............... 104/284

Primary Examiner—Reinhard J. Eisenzopf
Assistant Examiner—Robert W. Mueller
Attorney, Agent, or Firm—Helfgott & Karas

[57] ABSTRACT

To determine the relative positions of two bodies, an alternating current is passed through a conductive path in the first body, establishing an alternating magnetic field around the body, the amplitude of the field decreasing in inverse proportion to the distance from the conductive path. Coil pairs are supported on a second body so as to essentially surround the first body, the coils being used to produce voltages proportional to the intensity of the magnetic field, thereby providing differential distance information. The voltage differences of the coils can be used for establishing the shape of the first body or for positioning the second body to a coaxial location of the coil pairs with respect to the first body. The determination is largely free from interference.

6 Claims, 9 Drawing Figures

METHOD AND APPARATUS FOR THE CONTACTLESS DETERMINATION OF THE RELATIVE POSITIONS OF TWO BODIES

This invention relates to a method for determination of the position of a first body relative to a second body without establishing contact between the bodies, the distances between the bodies being determined in different directions in space, and also to an apparatus for performing the method.

BACKGROUND OF THE INVENTION

The basic problem of determining the position of one body relative to another without establishing contact between the bodies, or of determining the reciprocal positioning of the bodies, arises in various fields. The measured distances are used for determining the contours of the body with, for example, the aid of a computer, in the form of coordinates which are then delivered to a production machine for producing the measured body, or into an automatic drawing machine for producing a pictorial representation thereof. The results of the measurement can also be supplied to a regulating device making it possible to control a specific relative position of the two bodies with respect to each other during the movement thereof.

Radar processes, i.e., the use of reflected electromagnetic waves for detecting and locating objects, are known for the contactless measurement of distances. However, such methods are complicated and also suffer from certain deficiencies, for example, when one of the bodies has poor reflective characteristics. A practical use of the radar process is described in connection with an apparatus for winding conductors (Journal Le-Trefile, 3/1981, page 97).

BRIEF SUMMARY OF THE INVENTION

Accordingly, an object of the present invention is to provide a process for determining the relative positions of two bodies, without contact therebetween, in a simple manner and while avoiding the disadvantages of the prior art and while also substantially eliminating the effects of interference.

A further object is to provide an apparatus for accomplishing the determination of the relative position of two bodies in a contactless fashion.

A further object is to provide an apparatus which employs the resulting data to reposition one of the bodies relative to the other.

Briefly described, the invention includes a method for the contactless determination of the relative position of a first body and a second body including the steps of providing an electrically conductive path through the first body, passing an alternating current along the conductive path to establish a magnetic field, providing at least two pairs of electrical coils carried by the second body, the coils of each pair being disposed on opposite sides of the second body so that voltages are induced in the coils as a function of the positions thereof relative to the conductive path, and connecting the coils to a circuit for combining the voltages to produce an output representative of the relative positions of the bodies.

In another aspect, the invention comprises an apparatus for determining the relative positions between first and second bodies wherein the first body has an electrically conductive path therethrough comprising the combination of means for passing an alternating current through the first body to establish an alternating magnetic field and at least two pairs of electrical coils carried by the second body for producing voltages which are a function of their position in the field. The coils are disposed to essentially surround the first body with the coils of each pair being on opposite sides of the first body. The apparatus further includes circuit means connected to the coils for analyzing the relative magnitudes of the voltages and determining therefrom the relative positions of the bodies.

BRIEF DESCRIPTION OF THE DRAWINGS

In order that the manner in which the foregoing and other objects are attained in accordance with the invention can be understood in detail, particularly advantageous embodiments thereof will be described with reference to the accompanying drawings, which form a part of this specification, and wherein.

DETAILED DESCRIPTION OF THE PREFERRED EMBODIMENTS

Figure 1:
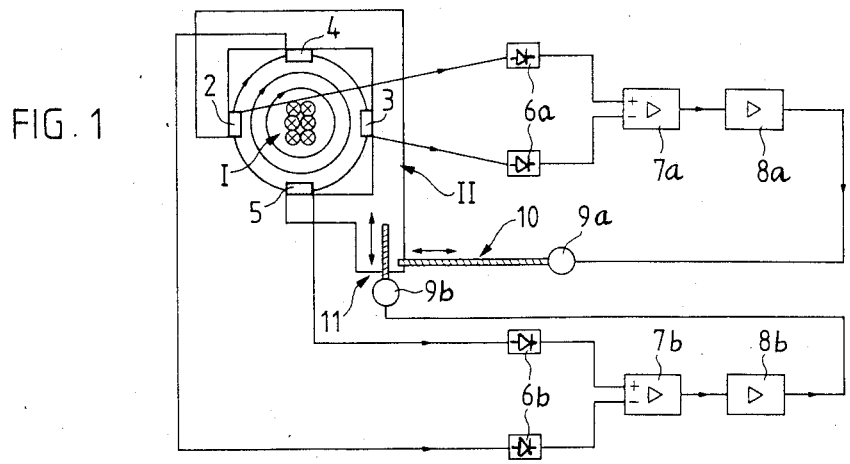
FIG. 1 is a simplified schematic diagram, partly in block form, of an apparatus in accordance with the invention.

FIG. 1 shows a positioning apparatus which operates according to a fundamentally different principle from that of the reflection of electromagnetic waves such as radar or light waves, all of which can easily be disturbed by external influences. The apparatus of FIG. 1 employs the aid of a magnetic field and presupposes that one of the bodies is made of an electrically conductive material while the other body is made from a material which does not disturb the magnetic field. This restriction does not constitute a particular problem with respect to the use of the process or apparatus because the bodies can, if necessary, be made conductive.

FIG. 1 shows a conductor I which is surrounded by an annular body indicated generally at II. Body II can also have any other random shape but is provided with at least a partial body which passes in an annular fashion around conductor I. An alternating current is passed through conductor I which causes the formation of a symmetrical alternating magnetic field around the conductor, this field being schematically represented in FIG. 1 by circles provided with arrows. The amplitude of the magnetic field decreases in inverse proportion to the distance from conductor I. The intensity of the magnetic field at various points in space is used as a measure for the positioning of a body relative to the conductor or body I. For this purpose, two coil pairs 2, 3 and 4, 5 on body II are placed around conductor I, coil pair 2, 3 being used for the measurement in the horizontal direction and coil pair 4, 5 in the vertical direction.

Voltages are induced in the coils of these coil pairs by the magnetic field, the voltages being proportional to the amplitude of the field. If conductor I is not in the center of the coil pairs, a higher voltage is induced in one of the coils of each pair than in the other. The voltages are rectified in rectifiers 6a for one coil pair and 6b for the other coil pair, the rectified voltage from rectifier 6a being delivered to a differential amplifier 7a which forms a voltage proportional to the differences between the two voltage values. This signal is amplified in an amplifier 8a and delivered to a motor 9a which is capable of driving a mechanical drive system such as a spindle drive 10 which can reposition the location of body II until the voltage difference in the coil pair 2, 3 is 0. Similarly, differential amplifier 7b and amplifier 8b provide a signal to drive motor 9b which operates a mechanical drive 11 to reposition body II until the voltage difference between coils 4 and 5 is 0. With this repositioning having been accomplished, the conductor I is precisely in the center between both coil pairs. Together with the spindle drives, the coil pairs form feedback control loops in which an error variation, in this case the differential voltage of the coil pairs, is used for the guidance of body II.

Interference only occurs in the control loop when there is interference in the magnetic field as a result of ferromagnetic materials. However, if the coils are relatively close to body I, a few centimeters nearer to body I than to body II, no significant interference to the magnetic field is to be expected if, for example, body II is made from ferromagnetic material which is, however, not necessary in most cases. If body I is moved longitudinally with respect to body II, for example, the position of body II is adjusted as a result of the described measuring and repositioning device in such a way that body I continues to be located in the center of coil pairs 2, 3 and 4, 5.

Figure 2:
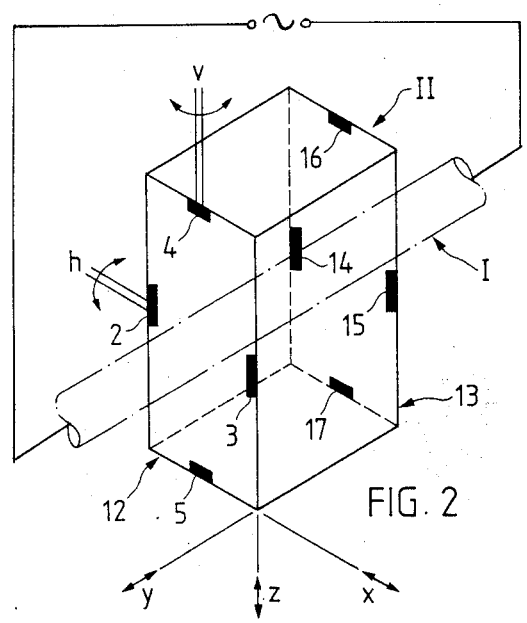
FIG. 2 is a schematic perspective view of an apparatus in accordance with the invention.

If body I is a bent or curved rod-shaped body, and if it is also required that body II always maintain a specific angular position with respect to the instantaneous axis of body I, the apparatus according to FIG. 1 is no longer adequate and it is necessary instead to use a position determination apparatus according to FIG. 2.

In FIG. 2, body I is a straight or curved rod while body II, i.e., the part surrounding body I, is in the form of a parallelepipedic grid. The grid is a rigid structure and has two parallel frames 12 and 13. Frame 12 carries the previously mentioned coil pairs 2, 3 and 4, 5 while frame 13 carries two further coil pairs 14, 15 and 16, 17 which are arranged on frame 13 in the same fashion as the coil pairs on frame 12. The coil pairs are the sensors or measuring elements of a total of four control loops. In order that the frames 12, 13 are always maintained in a perpendicular relationship to that portion of body I which is contained therein, the servo drives for the control loops of frame 13 also act in the plane of frame 12.

Figure 3:
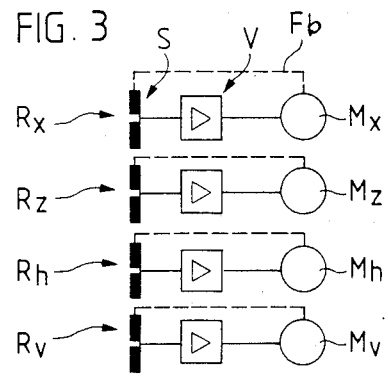
FIG. 3 is a schematic block diagram of a circuit arrangement for controlling the relative positions of two bodies.

Thus, four variable speed drives are required and these are diagrammatically shown in FIG. 3, i.e., in each case one drive is provided to move frame 12 in the direction of sensor or coil pair 2, 3 (along the x-axis); a separate drive acts along the direction of sensor 4, 5 (along the z-axis); a third drive rotates about the line passing through sensors 14, 15 (the horizontal rotation axis h); and a fourth drive rotates about the line through sensor 16, 17 (the vertical rotation axis v). The four variable speed drives Rx, Rz, Rh and Rv are schematically shown in FIG. 3 with each drive system having a coil pair S, an amplifier stage V, which also contains the rectification and voltage comparison, a servo motor Mx, Mz, Mh or Mv, and a mechanical feedback connection Fb.

Figure 4:
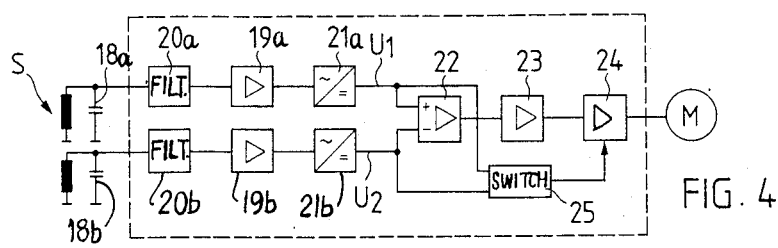
FIG. 4 is a schematic circuit diagram, partially in block form, of a control circuit usable in the arrangement of FIG. 3.

FIG. 4 shows in somewhat greater detail one of the variable speed drives for a pair of coils. A capacitor 18a, 18b is electrically connected in parallel circuit relationship with each of the individual sensor coils of a coil pair S so that the two coils operate in resonance at the frequency of the magnetic field with the loop current functioning as an oscillatory circuit. Capacitor 18a and its associated coil are connected to a filter 20a which is designed to filter out interfering voltages which can still occur despite the tuned resonant circuits because of the presence of strong line voltage fields at 50 or 60 Hz, including their harmonics. The filter output is connected to an amplifier 19a which amplifies the AC voltage in such a way that the subsequent rectification does not occur in the non-linear region of the diode detectors. The subsequent rectifier 21a produces a DC voltage U1 which is proportional to the AC voltage of the resonant circuit and this voltage is supplied to one input of a differential amplifier 22. The output of coil and capacitor 18b is similarly filtered, amplified and rectified by circuits 20b, 19b and 21b, producing an output voltage U2 which is supplied to the other input of differential amplifier 22. The output of amplifier 22 is connected to a following amplifier 23 which provides a signal to output stage 24 to drive its associated motor M. A switching stage 25 is connected to the output of rectifiers 21a and b and also provides an input to output stage 24 for polarity determination.

When the two voltages U1 and U2 are the same, the output of differential amplifier 22 is 0 and no signal is supplied to the following circuits, permitting the motor to remain in its previous position. However, if the body II is not in the center between coil pair S, the difference between values U1 and U2 is not 0. Depending upon which of the two voltages is higher, the differential voltage is given an appropriate polarity sign so that the motor runs in one or the other direction and appropriately adjusts the coil pair toward the center of body I.

Figure 5:
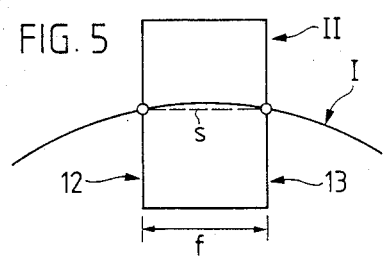
FIG. 5 is a diagrammatic view of the positioning of two bodies of which one is curved.

FIG. 5 shows the position adjustment of body II relative to a curved body I. Coil pairs 2, 3 and 4, 5, by means of their variable speed drives, move frame 12 into the center position with respect to body I, while coil pairs 14, 15 and 16, 17 adjust the position of frame 13 about the horizontal and vertical rotation axes by means of their variable speed drives which are arranged in the plane of frame 12 until frame 13 also assumes its center position with respect to body I. Because variable speed drives Rh and Rv are located in the plane of frame 12, it is not its central position, but its slope with respect to body I which is adjusted until the frame 13, fixedly attached to frame 1, has also assumed its center position. It can be seen from the schematic view of FIG. 5 that body II can be controlled with four coil pairs in such a way that it is always perpendicular to the chord s, shown as a dotted line, which interconnects the centers of the two frames 12, 13. Thus, it is possible to scan bodies I which have various shapes and extensions.

Figure 7:
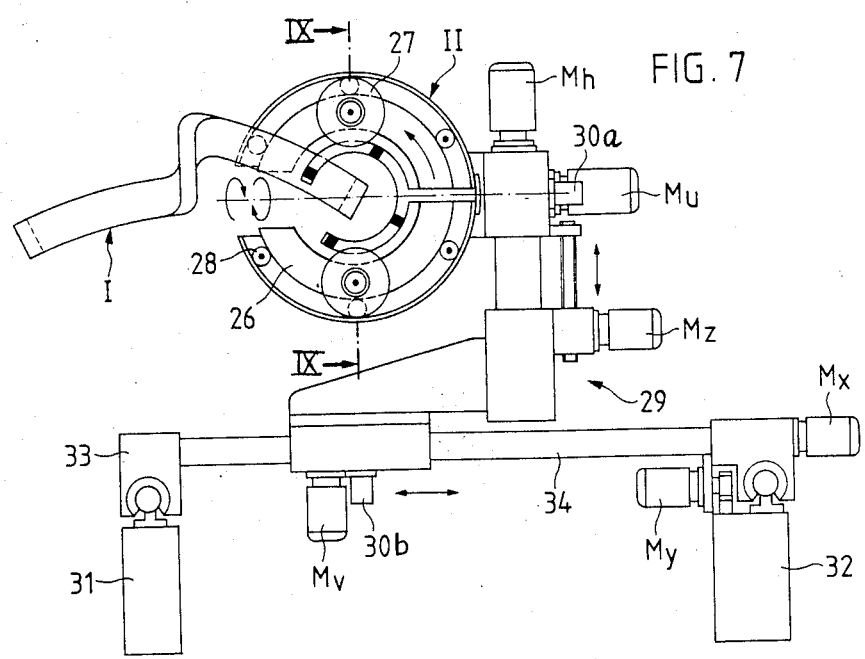
FIG. 7 is a simplified side elevation of a strip winding machine incorporating the present invention and usable in conjunction with the arrangement of FIG. 6.

If the apparatus described in FIG. 2, together with its variable speed drives, is constructed as a strip winding head permitting a strip, band or tape to be wound around body I, such as a conductor I, the strip winding machine shown in FIG. 7 can be used for this purpose. Body II is represented as an annular strip winding head within which is located a rotatable strip winding device 26 equipped with a drive Mu and having two strip winding reels 27, the device 26 being rotatably mounted on rollers 28.

Body II, or the strip winding head, is supported, along with drives Mz and Mh of the corresponding variable speed drive coils Rz and Rh, on a stand or bracket 29 so as to be pivotable about the horizontal axis as well as liftable and lowerable. The rotation about the vertical axis is accomplished by drive Mv, each of the variable speed drives Rh and Rv having an angular pick up 30a, 30b associated therewith as the mechanical feedback.

Continuous advance of body II or of the strip winding head is required when winding a strip around a conductor and, for this purpose, the feed drive My with a corresponding variable speed drive sensor Ry is used. Drive My moves a table 33 mounted on two bases 31, 32 on which is supported the stand 29. The displacement of stand 29 in the x-axis is accomplished by a drive Mx of variable speed drive Rx, e.g., by a spindle drive.

Figure 6:
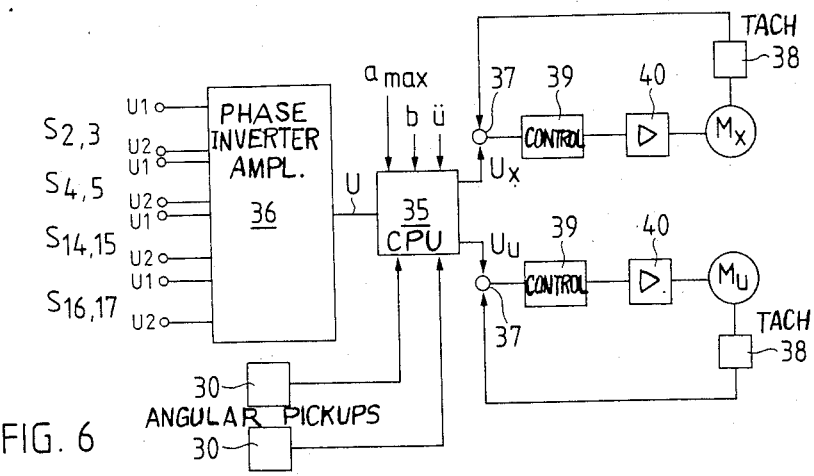
FIG. 6 is a schematic circuit diagram, partially in block form, of a positioning system for a strip winder incorporating the principles of the present invention and for use with curved electrical conductors.

In order to obtain uniform strip winding of a conductor, when passing from a straight to the curved conductor portion the advance, i.e., the speed of the variable speed drive Ry and the angular velocity, which is a function of the variable speed drive Ru, must be varied as a function of the radius of curvature for which purpose a computer 35 is used as illustrated in FIG. 6. The voltages of the coil pairs S2, 3; S4, 5; S14, 15; and S16, 17 are supplied to a phase inverter amplifier 36 which also contains the differentiating elements. The voltage U formed therefrom has its maximum when no further voltage changes can be determined in the voltages from the coil pairs. If one voltage U1 or U2 changes, then voltage U is reduced as a function of the rate of change so that the voltage is a measure of the curvature of the conductor to be scanned. If U is high, then there is no curvature while if U increases, a corresponding curvature exists.

In order to determine the resultant movement of direction of stand 29, the values of the two angular pick ups 30 are fed into computer 35, together with the values for the maximum velocity $a_{max}$, the strip width b and the strip overlap ü. The computer supplies corresponding voltage values, e.g., Ux for the movement in the x-axis and Uu for the strip winding speed to comparator 37 which makes a comparison with the voltage in the particular drive Mx or Mu generated by a tachometer generator 38. Any difference between these two voltages is applied to a control element 39 and an output stage 40 for controlling the speed of the corresponding drive motor. Thus, using a circuit according to FIG. 6, it is possible to determine the actual feed speed of the strip winding head or body II with respect to the conductor, or body I, and consequently the strip winding speed can be controlled so that the ratio of these two values is always kept constant.

Figure 8:
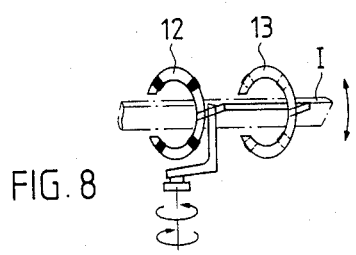
FIG. 8 is a perspective, schematic view of a portion of the apparatus of FIG. 7.
Figure 9:
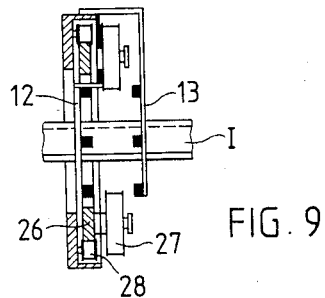
FIG. 9 is a sectional view along line IX—IX of FIG. 7.

FIGS. 8 and 9 show details of the strip winding head of FIG. 7, FIG. 8 being a schematic perspective view of the two frames 12 and 13 and their rigid interconnection. FIG. 9 is a section through the strip winding head. Comparing these with FIG. 5, it will be recognized that the distance f between the two frames 12, 13 must be kept as small as possible but must be at least twice the strip width. The difference between chord s and the associated arc as illustrated in FIG. 5 must be as small as possible because, otherwise, it would no longer be possible to accurately maintain the vertical angular direction of the strip with respect to the conductor to be scanned.

If the above described apparatus is to be used for the measurement of a body I which is in the form of a pipe such as an exhaust pipe, a hydraulic tube, a bent metal structure or the like, it is possible to provide at the individual movement axes, apart from the strip winding drive Mu, incremental angular step pick ups or other path determining systems which transfer the particular positions to a computer which can then calculate the x-y-z coordinates from the values and, on the basis thereof, set up a bending program or a program for an automatic drawing machine.

While certain advantageous embodiments have been chosen to illustrate the invention, it will be understood by those skilled in the art that various changes and modifications can be made therein without departing from the scope of the invention as defined in the appended claims.

What is claimed is:

1. An apparatus for determining the relative positions between first and second bodies wherein the first body has an electrically conductive path therethrough comprising the combination of means for passing an alternating electrical current through said first body to establish an alteranting magnetic field;

first and second rigidly interconnected parallel, planar frames fixedly attached to said second body;

two pairs of electrical coils carried by each of said first and second frames in the planes of said frames for producing voltages which are a function of the positions of said coils in said field, said coils being disposed to essentially surround said first body with the coils of each pair being on opposite sides of said first body; and circuit means connected to said coils for analyzing the relative magnitudes of said voltages and determining thereform the relative positions of said bodies wherein said second body comprises a strip winding machine and said first body comprises a member to be wrapped by said machine, said machine further including a base, a strip winding head movably supported on said base first and second drive means for rotating said head about mutually orthogonal axes third linear drive means for bidirectionally moving said head in the direction aligned with one coil pair on one frame fourth linear drive means for bidirectionally moving said head in a direction perpendicular to the drive movement of said third drive means; and a strip winding drive.

2. An apparatus for determining the relative positions between first and second bodies wherein the first body has an electrically conductive path therethrough comprising the combination of means for passing an alternating electrical current through said first body to establish an alternating magnetic field;

first and second rigidly interconnected parallel, planar frame fixedly attached to said second body;

two pairs of electrical coils carried by each of said first and second frames in the planes of said frames for producing voltages which are a function of the positions of said coils in said field, the two pairs of coils on one frame controlling rotational movement about orthogonal axes and the two pairs of coils on the other frame controlling rectilinear movement about orthogonal axes, said coils being disposed to essentially surround said first body with the coils of each pair being on opposite sides of said first body; and circuit means connected to said coils for analyzing the relative magnitudes of said voltages and determining therefrom the relative positions of said bodies.

3. An apparatus according to claim 2, and further comprising a variable speed drive means respectively controlled by a respective one of said electrical coils, each said speed drive means being coupled to control a movement of said second body in a direction corresponding to that being controlled by its electrical coil.

4. A method for the contactless determination of the relative positions of a first body and a second body comprising the steps of providing an electrically conductive path through the first body;

passing an alternating current along the conductive path to establish a magnetic field;

rigidly supporting two pairs of electrical coils in a first plane on the second body, the coils of each pair being disposed on opposite sides of the second body along a line perpendicular to the other pair and controlling rotational movement about the two perpendicular lines so that voltages are induced in the coils as a function of the rotational positions thereof relative to the conductive path;

rigidly supporting two further pairs of electrical coils in a second plane on the second body, the second plane being parallel with and spaced from the first plane and moving with the first plane, the coils of each further pair being disposed on opposite sides of the second body along a line perpendicular to the other pair and controlling rectilinear movement about the two perpendicular lines so that voltages are induced in the coils as a function of the rectilinear positions thereof relative to the conductive path; and connecting the pairs of coils in a circuit for combining the voltages to produce an output representative of the relative positions of the bodies.

5. A method according to claim 4 and including forming a voltage difference between the voltages produced by the two coils in each pair to provide the output voltage, and applying the output voltage to a variable speed drive to alter the position of the body carrying the coil pairs to equalize the coil voltages.

6. A method according to claim 5 wherein the first body follows a curved shape and the second body is to be repositioned to maintain a predetermined relationship with the first body, including measuring the changes to the voltage difference of a pair of coils, and using the changes as a reference to compute the correct position relationship of the second body relative to the first.

* * * * *